United States Patent
Aggarwal et al.

(10) Patent No.: US 11,599,720 B2
(45) Date of Patent: Mar. 7, 2023

(54) MACHINE LEARNING MODELS FOR ELECTRONIC MESSAGES ANALYSIS

(71) Applicant: SHL (India) Private Limited, Mumbai (IN)

(72) Inventors: Varun Aggarwal, Haryana (IN); Rohit Takhar, Haryana (IN); Abhishek Unnam, Haryana (IN)

(73) Assignee: SHL (India) Private Limited, Mumbai (IN)

( * ) Notice: Subject to any disclaimer, the term of this patent is extended or adjusted under 35 U.S.C. 154(b) by 242 days.

(21) Appl. No.: 16/941,171

(22) Filed: Jul. 28, 2020

(65) Prior Publication Data

US 2021/0034814 A1 Feb. 4, 2021

(30) Foreign Application Priority Data

Jul. 29, 2019 (IN) .............................. 201911030466

(51) Int. Cl.
*G06F 40/205* (2020.01)
*G06N 20/00* (2019.01)
*G06F 40/232* (2020.01)

(52) U.S. Cl.
CPC .......... *G06F 40/205* (2020.01); *G06F 40/232* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,182,029 | B1 * | 1/2001 | Friedman | G06F 40/289 715/236 |
| 6,405,225 | B1 * | 6/2002 | Apfel | G06Q 10/107 715/250 |
| 9,747,275 | B1 * | 8/2017 | Barsness | H04W 4/025 |
| 10,419,375 | B1 * | 9/2019 | Sokolov | H04L 51/212 |
| 11,200,267 | B2 * | 12/2021 | Kadatoka | G06F 16/353 |
| 2008/0052272 | A1 * | 2/2008 | Altaf | G06F 40/232 |
| 2011/0313757 | A1 * | 12/2011 | Hoover | G06F 40/205 704/9 |
| 2012/0123767 | A1 * | 5/2012 | Ananthanarayanan | G06F 40/253 704/9 |

(Continued)

OTHER PUBLICATIONS

Repke, Tim, and Ralf Krestel. "Bringing back structure to free text email conversations with recurrent neural networks." European Conference on Information Retrieval. Springer, Cham, 2018. (Year: 2018).*

(Continued)

*Primary Examiner* — Douglas Godbold
(74) *Attorney, Agent, or Firm* — IP Spring

(57) ABSTRACT

A method may include receiving an electronic message from a sender. The method may further include parsing the electronic message into a set of sections, the set of sections including structured sections and an unstructured section. The method may further include detecting etiquette errors in the structured sections of the electronic message, wherein the etiquette errors include at least one of a missing word, a redundant word, an incorrect usage of a word, a style error, an emotional punctuation error, or a punctuation error. The method may further include generating an etiquette score based on the etiquette errors.

20 Claims, 7 Drawing Sheets

(56) References Cited

U.S. PATENT DOCUMENTS

| | | | |
|---|---|---|---|
| 2014/0114642 A1* | 4/2014 | van den Oever | G06F 40/44 704/2 |
| 2015/0113435 A1* | 4/2015 | Phillips | G06F 3/0488 715/752 |
| 2018/0006979 A1* | 1/2018 | Barsness | H04L 51/52 |
| 2018/0063262 A1* | 3/2018 | Balasubramanian | H04L 51/212 |
| 2019/0205377 A1* | 7/2019 | Munro | G06F 40/30 |
| 2019/0363959 A1* | 11/2019 | Rice | H04L 43/026 |
| 2020/0104357 A1* | 4/2020 | Bellegarda | G06N 3/088 |
| 2021/0374677 A1* | 12/2021 | Michels | H04L 51/214 |

OTHER PUBLICATIONS

IPO, First Examination Report for Indian Patent Application No. 201911030466, dated Feb. 4, 2022, 6 pages.

\* cited by examiner

MACHINE LEARNING MODELS FOR ELECTRONIC MESSAGES ANALYSIS

CROSS REFERENCE TO RELATED APPLICATIONS

This application claims the benefit of Indian Provisional Patent Application No. 201911030466, entitled "System to Generate Feedback on Emails," filed Jul. 29, 2019, which is incorporated by reference in its entirety.

BACKGROUND

In today's economy, good communication skills are vital for success in the workplace. According to one study, 53% of all jobs require a moderate to high level of writing and speaking skills.

There is no standard list of rules for how to craft a proper electronic message. For example, a survey of articles written about electronic message writing rules yielded a set of 57 different possible rules. However, when these rules were provided to professionals from different business areas and cultures, they could not decide on a uniform standard for grading when applying the rules. Furthermore, because people apply different rules to electronic messages and because even one person can use inconsistent rules to grade electronic messages, there is no way to create a consistent set of rules to codify into software.

SUMMARY

In some embodiments, a method comprises receiving an electronic message from a sender. The method may further include parsing the electronic message into a set of sections, the set of sections including structured sections and an unstructured section. The method may further include detecting etiquette errors in the structured sections of the electronic message, wherein the etiquette errors include at least one of a missing word, a redundant word, an incorrect usage of a word, a style error, an emotional punctuation error, or a punctuation error. The method may further include generating an etiquette score based on the etiquette errors.

In some embodiments, the method further includes highlighting the etiquette score and each etiquette error in the electronic message to prompt the sender to correct the etiquette errors and providing a recommendation for how to correct the etiquette errors. The method may further include correcting the etiquette errors in the electronic message. In some embodiments, the structured sections include a subject, a salutation, an opening sentence of a body, a closing sentence of a body, and a closing.

The method may further include applying a machine-learning grammar model to the unstructured section; obtaining, as output of the machine-learning grammar model, a grammar score; applying a machine-learning content model to the unstructured section; and obtaining, as output of the machine-learning content model, a content score. The method may further include generating an overall score that is an average of the etiquette score, the grammar score, and the content score and providing an error summary that includes the overall score, the etiquette score, the grammar score, and the content score. The method may further include generating an error summary that details at least one of a number of etiquette errors, a number of spelling errors, a number of white space errors, a number of style errors, a number of grammar errors, or a number of typographical errors. In some embodiments, wherein the machine-learning grammar model is generated based on training set data that includes training messages associated with corresponding grammar scores that score the training messages based on a set of rubrics. The method may include providing feedback that suggests how to modify the electronic message to improve at least one of the etiquette score, the grammar score, or the content score. In some embodiments, wherein one or more of the machine-learning content model or the machine-learning grammar model are made using one or more of linear or non-linear techniques.

The method may further include deriving one or more of word embeddings, a bag of words, or a prompt overlap from the electronic message and providing one or more of the word embeddings, the bag of words, or the prompt overlap to the machine-learning content model, wherein the machine-learning content model outputs the grammar score as a result. The method may further include deriving one or more of a bag of part of speech (POS) tags, a bag of stopwords POS (SPOS) tags, a count of grammar errors, or a proportion of grammatically correct tags in the electronic message and providing the one or more of the bag of POS tags, the bag of SPOS tags, the count of grammar errors, or the proportion of grammatically correct tags to the machine-learning grammar model, wherein the machine-learning grammar model outputs the grammar score as a result.

In some embodiments, a system comprises one or more processors and a memory that stores instructions that, when executed by the one or more processors, cause the one or more processors to perform operations comprising: receiving an electronic message from a sender, parsing the electronic message into a set of sections, the set of sections including structured sections and an unstructured section, detecting etiquette errors in the structured sections of the electronic message, wherein the etiquette errors include at least one of a missing word, a redundant word, an incorrect usage of a word, a style error, an emotional punctuation error, or a punctuation error, and generating an etiquette score based on the etiquette errors.

In some embodiments, the operations further comprise highlighting the etiquette score and each etiquette error in the electronic message to prompt the sender to correct the etiquette errors and providing a recommendation for how to correct the etiquette errors. In some embodiments, the operations further include applying a machine-learning grammar model to the unstructured section; obtaining, as output of the machine-learning grammar model, a grammar score; applying a machine-learning content model to the unstructured section; and obtaining, as output of the machine-learning content model, a content score. In some embodiments, the operations further comprise deriving one or more of word embeddings, a bag of words, or a prompt overlap from the electronic message and providing one or more of the word embeddings, the bag of words, or the prompt overlap to the machine-learning content model, wherein the machine-learning content model outputs the grammar score as a result. In some embodiments, the operations further comprise deriving one or more of a bag of part of speech (POS) tags, a bag of stopwords POS (SPOS) tags, a count of grammar errors, or a proportion of grammatically correct tags in the electronic message and providing the one or more of the bag of POS tags, the bag of SPOS tags, the count of grammar errors, or the proportion of grammatically correct tags to the machine-learning grammar model, wherein the machine-learning grammar model outputs the grammar score as a result.

In some embodiments, a non-transitory computer-readable medium includes instructions stored thereon that, when executed by one or more computers, cause the one or more computers to perform operations, the operations comprising: receiving an electronic message from a sender, parsing the electronic message into a set of sections, the set of sections including structured sections and an unstructured section, detecting etiquette errors in the structured sections of the electronic message, wherein the etiquette errors include at least one of a missing word, a redundant word, an incorrect usage of a word, a style error, an emotional punctuation error, or a punctuation error, and generating an etiquette score based on the etiquette errors.

In some embodiments, the operations further comprise highlighting the etiquette score and each etiquette error in the electronic message to prompt the sender to correct the etiquette errors and providing a recommendation for how to correct the etiquette errors. In some embodiments, the operations further include applying a machine-learning grammar model to the unstructured section; obtaining, as output of the machine-learning grammar model, a grammar score; applying a machine-learning content model to the unstructured section; and obtaining, as output of the machine-learning content model, a content score. Previous approaches to analyzing electronic message have included applying machine learning indiscriminately to an entire electronic message. However, this approach results in inaccurate analysis. As described below, the specification describes a system that uses a rule-based model for processing the structured parts of an electronic message and for grading on etiquette. The system additionally uses machine learning to analyze the content of the electronic message and grammar.

The embodiments provided herein advantageously describe software, as embodied in a method, system, and computer-readable medium, that generates an etiquette score by determining whether etiquette features apply to the structured sections, applies a machine-learning content model to generate a content score, and applies a machine-learning grammar model to generate a grammar score. By using machine-learning models, the software provides a consistent analysis of electronic messages. In some embodiments, the software provides feedback to users for how to improve the electronic messages to obtain better scores.

As a result, the specification proposes a viable system for automatically analyzing electronic message writing skills and for delivering constructive feedback. The system demystifies the components of good email and provides objective evaluation criteria. As a result of using a rule-based model and machine-learning models, the system is more accurate than other techniques.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System

Figure 1:
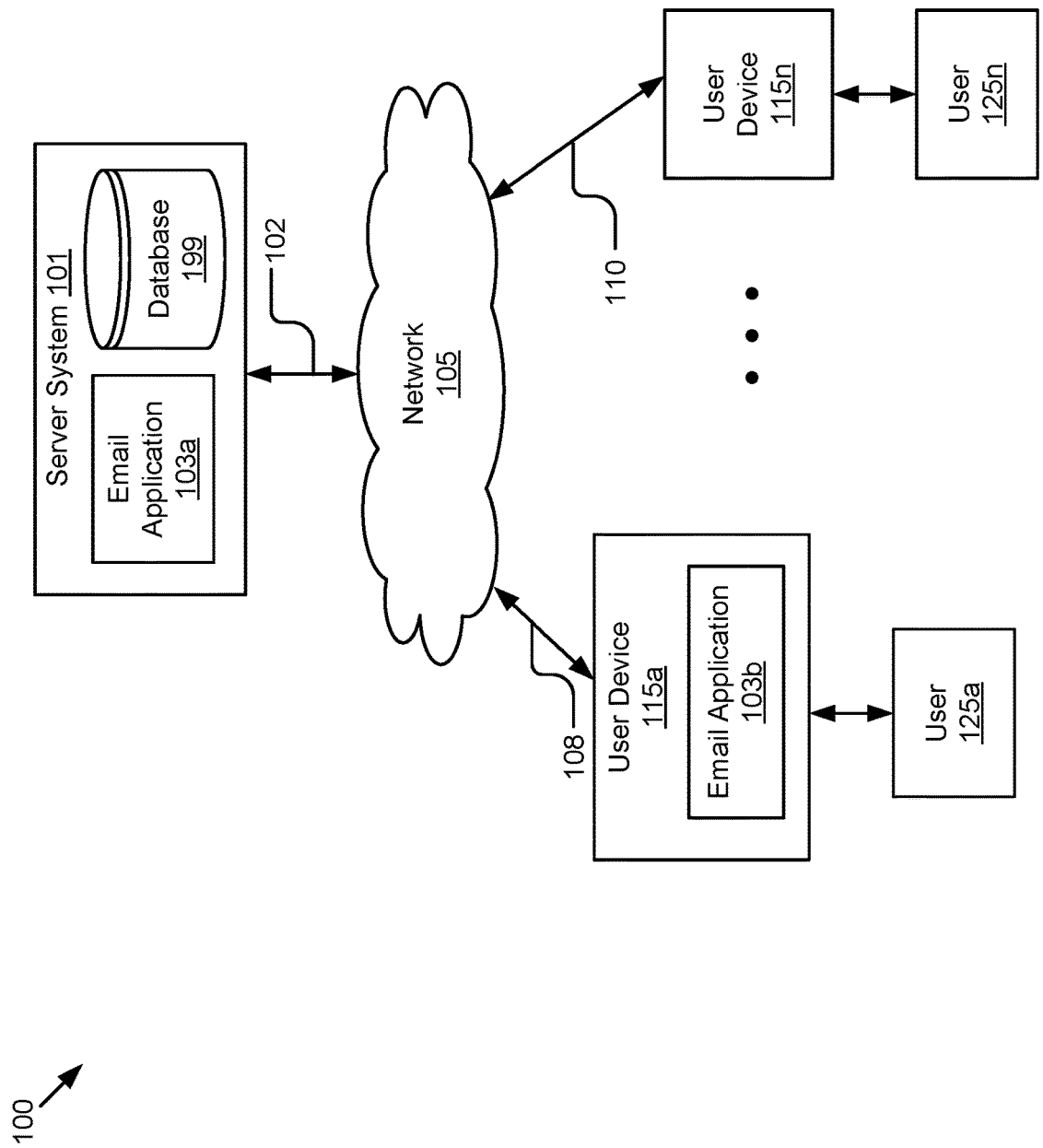
FIG. 1 illustrates a block diagram of an example system that analyses electronic messages, according to some embodiments.

FIG. 1 illustrates a block diagram of an example system 100 that analyzes electronic messages. The illustrated system 100 includes a server system 101, and user devices 115a-115n, coupled via a network 105. Users 125a, 125n may be associated with respective user devices 115a, 115n. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The server system 101 may include a processor, a memory, and network communication capabilities. In some embodiments, the server system 101 is a hardware server. The server system 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server system 101 sends and receives data to and from one or more of the user devices 115a, 115n via the network 105. The server system 101 may include an electronic message application 103a and a database 199.

The electronic message application 103a may include code and routines operable to analyze electronic messages. In some embodiments, the electronic message application 103a is a plug-in, an add-on, or a standalone application that provides scoring and feedback for electronic messages. For example, a user may use the electronic message application 103a to review messages before sending them and for receiving feedback on how to improve the electronic messages.

The electronic message application 103a may generate an etiquette score by detecting etiquette errors, apply a machine-learning grammar model to the electronic message to generate a grammar score, and apply a machine-learning content model to the electronic message to generate a content score. In some embodiments, the electronic message application 103a may be implemented using hardware including a field-programmable gate array (FPGA) or an application-specific integrated circuit (ASIC). In some embodiments, the electronic message application 103a may be implemented using a combination of hardware and software.

The database 199 may store information related to the operation of the electronic message application 103. For example, the database 199 may store electronic messages, training sets, etc. In some embodiments, the database 199 includes a separate database for the electronic messages and a separate database for the training sets.

The user device 115 may be a computing device that includes a memory and a hardware processor. For example, the user device may include a desktop computer, a laptop, a mobile device, a tablet computer, a mobile telephone, a wearable device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, electronic message application 103b may be stored on a user device 115a. The electronic message application 103 may include a thin-client electronic message application 103b stored on the user device 115a and an electronic message application 103a that is stored on the server system 101. For example, the electronic message application 103b stored on the user device 115a may display a user interface for inputting an electronic message. The user device 115a may receiver user input, such as the electronic message. The user device 115a may transmit the electronic message to the electronic message application 103a stored on the server system 101 for grading. In some implementations, grading may be performed locally on user device 115a.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, or a cellular communications network for sending and receiving data including via short messaging service (SMS), multimedia messaging service (MMS), hypertext transfer protocol (HTTP), direct data connection, electronic message, etc. Although FIG. 1 illustrates one network 105 coupled to the user devices 115 and the server system 101, in practice one or more networks 105 may be coupled to these entities.

Example Computing Device

Figure 2:
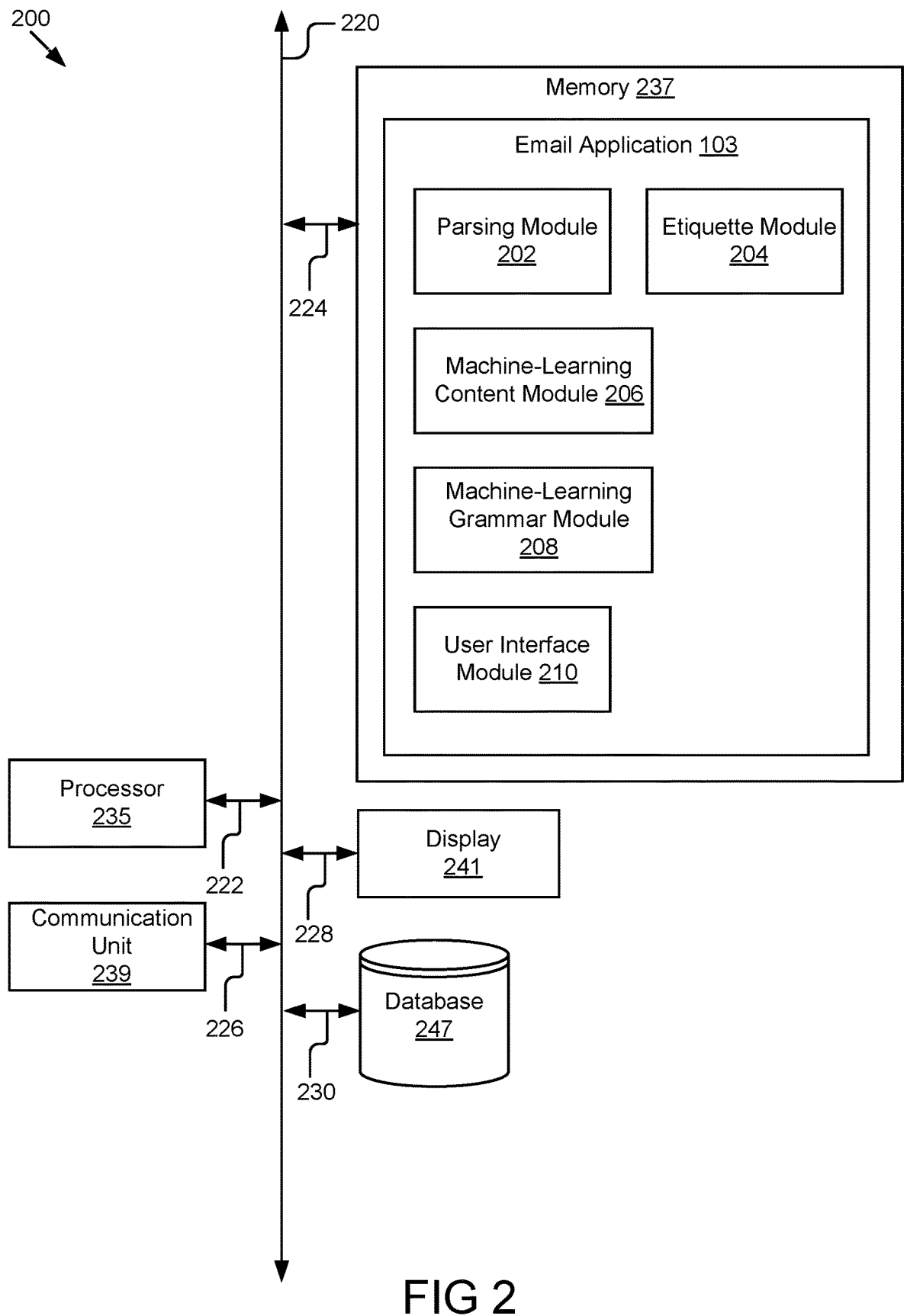
FIG. 2 illustrates a block diagram of an example computing device that analyzes electronic messages, according to some embodiments.

FIG. 2 illustrates a block diagram of an example computing device 200 that grades electronic messages. The computing device 200 may be a server system 101 or a user device 115. The computing device 200 may include a processor 235, a memory 237, a communication unit 239, a display 241, and a database 247. Additional components may be present or some of the previous components may be omitted depending on the type of computing device 200. For example, if the computing device 200 is the server system 101, the computing device 200 may not include the display 241. An electronic message application 103 may be stored in the memory 237. In some embodiments, the computing device 200 may include other components not listed here, such as a battery, etc. In some embodiments, the electronic message application 103 may be stored in part on the server system 101 and in part on the user device 115. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the electronic message application 103, which is described in greater detail below. The memory 237 is coupled to the bus 220 for communication with the other components via signal line 224.

The communication unit 239 transmits and receives data to and from at least one of the user device 115 and the server system 101 depending upon where the electronic message application 103 may be stored. In some embodiments, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the server system 101, depending on where the electronic message application 103 may be stored. In some embodiments, the communication unit 239 includes a wireless transceiver for exchanging data with the user device 115, server system 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), etc.

The display 241 may include hardware operable to display graphical data received from the electronic message application 103. For example, the display 241 may render graphics to display a user interface for receiving user input for an electronic message and that displays feedback. The display 241 is coupled to the bus 220 for communication with the other components via signal line 228.

The database 247 may be a non-transitory computer-readable storage medium that stores data that provides the functionality described herein. In embodiments where the computing device 200 is the server system 101, the database 247 may include the database 199 in FIG. 1. The database 247 may be a DRAM device, a SRAM device, flash memory or some other memory device. In some embodiments, the database 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The database 247 is coupled to the bus 220 for communication with the other components via signal line 230.

The electronic message application 103 may include a parsing module 202, an etiquette module 204, a machine-learning content module 206, a machine-learning grammar module 208, and a user interface module 210.

The parsing module 202 parses electronic messages. In some embodiments, the parsing module 202 includes a set of instructions executable by the processor 235 to parse the electronic messages. In some embodiments, the parsing module 202 is stored in the memory 237 of the computing device 200 and can be accessible and executable by the processor 235.

In some embodiments, the parsing module 202 receives an electronic message. For example, the user interface module 210 may generate a user interface that receives an electronic message directly from a user, e.g., via data entry using a keyboard, touchscreen, voice input, or other suitable input mechanism. In some embodiments, the parsing module 202 may receive the electronic message from another source, such as an email application, a word processing application, etc.

Figure 3:
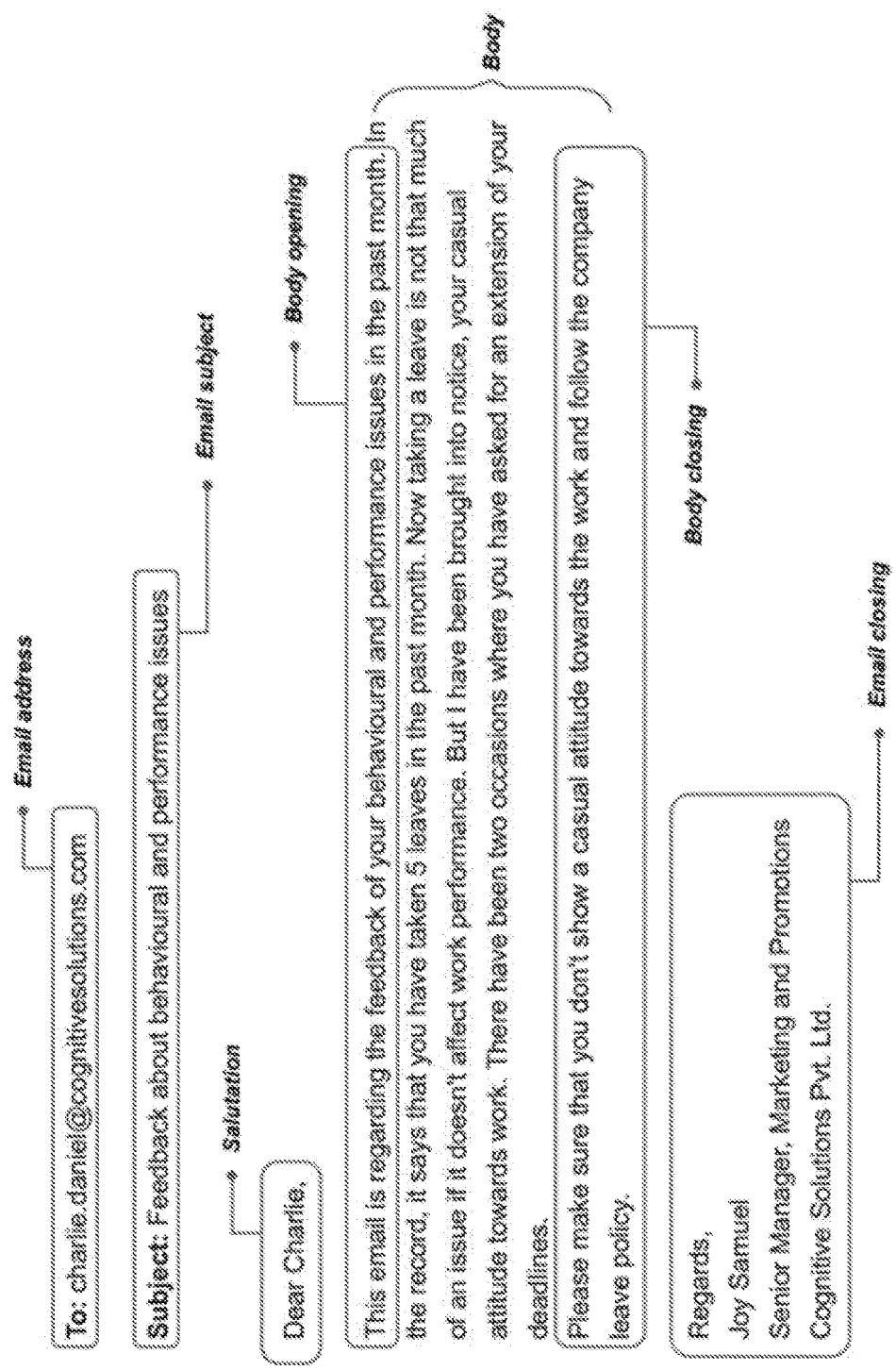
FIG. 3 illustrates an example electronic message that is divided into sections, according to some embodiments.

The parsing module 202 parses the electronic message into a set of sections that include structured sections and an unstructured section. For example, the parsing module 202 identifies the structured sections of the electronic message as including a subject, a salutation, an opening sentence of a body, a closing sentence of the body, and a closing. In some embodiments, the parsing module 202 identifies that the body also includes an unstructured section (e.g., the content of the body). Turning to FIG. 3, an example electronic message 300 that is divided into sections is illustrated. In this example, the electronic message 300 is divided into an email address, an email subject, a salutation, a body with a body opening and a body closing, and an email closing. The parsing module 202 identifies the structured sections as including the email address, the email subject, the salutation, the body opening, the body closing, and the email closing. The parsing module 202 identifies the rest of the body as including the unstructured section.

The etiquette module 204 generates an etiquette score by detecting etiquette errors in an electronic message, e.g., parsed by parsing module 202. In some embodiments, the etiquette module 204 includes a set of instructions executable by the processor 235 to detect etiquette errors and generate the etiquette score. In some embodiments, the etiquette module 204 is stored in the memory 237 of the computing device 200 and can be accessible and executable by the processor 235.

Etiquette features for evaluating electronic messages go beyond the parameters traditionally defined in the grading of written language. For good communication, electronic messages are required to adhere to certain rules, some of which are derived from rules for verbal communication, while others are specific to the written form of the electronic message.

In some embodiments, the etiquette module 204 detects etiquette errors by identifying whether any structured section is missing. For example, the etiquette module 204 assigns a score to each structured section and if a structured section is missing, such as an electronic message that lacks a subject line (e.g., has an empty subject line, or a subject line such as "Re:" indicating it is a reply or "Fwd:" indicating that it is a forwarded message, or which is otherwise devoid of actual content), the etiquette module 204 does not assign a score to the subject section. Next, the etiquette module 204 applies rules for how each structured section should appear. In some embodiments, the etiquette module 204 grades each structured section based on redundancy of terms, word usage, style, emotional punctuation, and/or punctuation. For example, the etiquette module 204 includes a rule that the salutation should not address the recipient by both first and last name, that a title should be added when addressing a person by only their last name, and that outdated terms, such as "respected," are not used but acceptable terms, such as "hi," "hello," or "dear," are used. In another example, the etiquette module 204 includes a rule that the subject line should not be longer than a predetermined length. In some embodiments, the etiquette module 204 includes rules that, with the exception of acronyms, no words should appear in all upper case and no emoticons be present. Violation of one or more rules by the electronic message, as detected by the etiquette module 204, results in the etiquette module assigning a lower etiquette score to the electronic message.

In some embodiments, the etiquette module 204 applies rules to structured sections of the body of the electronic message. In some embodiments, the etiquette module 204 receives a prompt from a user interface provided to the user by the user interface module 210. The prompt describes a purpose for the electronic message. In some embodiments, the etiquette module 204 determines that the opening sentence and/or the closing sentence in the body of the electronic message match the purpose for the electronic message. For example, where the purpose of the electronic message is to respond to an irate customer, the etiquette module 204 assigns a poor score (e.g., a low score) to an opening sentence that states: "Hope you are doing well." Similarly, the etiquette module 204 checks that an electronic message where the purpose is to obtain information from the recipient has a closing sentence that states "I look forward to your response," while a simple conversation may end with something more generic, such as "Feel free to reach out to me."

In some embodiments, the etiquette module 204 divides the scoring into six different categories where each category has a different number of rules. For example, in Table 1 below, the etiquette module 204 applies four different rules based on whether sections are missing, six different rules based on redundancies in the electronic message, ten rules based on whether the word usage is proper, seven rules based on the style of the electronic message, five rules based on emotional punctuation, and five rules based on more general punctuation errors including capitalization. It will be recognized that this is one example and other numbers or combinations of rules are possible.

TABLE 1

Etiquette features with explanations and examples

| Etiquette Feature | Explanation and Examples | Count |
|---|---|---|
| Missing | Missing subject line, salutation, signoff etc.<br>Subject:<br>Email Body: This is to inform you that . . . | 4 |
| Redundancy | Starting the subject line with terms such as 'regarding', 'response to',<br>Subject: regarding behavioral and performance issues. | 6 |
| Word usage | Incorrect usage of words in various sections of an email - using names/greetings in subject line, usage of informal, abbreviated words etc.<br>Subject: Employee feedback for Charlie Daniels<br>Email Body: Hi Daniel, Can u pls respond to the customer complaint quickly . . . | 10 |
| Style | Errors specific to conventions like greeting and sign-off style.<br>Email Body:<br>Hella Daniel/Heyy Charlie Daniels/Hi Mr Charlie Daniel<br>. . .<br>Yours Sincerely/Truly/faithfully<br>Mr Charlie Daniel | 7 |
| Emotional Punctuation | Errors like using too many commas inside a sentence, using exclamation/semi-colons marks inside subject/salutation/closing, using all uppercase words in subject line etc.<br>Subject: POOR performance !!! neeed improvement<br>Email Body: Heyy!! Charlie, HI CHARLIE please reply . . . Thanks, Alisha. | 5 |
| Punctuation | Capitalisation errors like starting subject line with lowercase, proper nouns starting in lowercase etc. Not giving space after fullstop.<br>Subject: feedback on performance<br>Email Body:<br>hi charlie daniel, This is to inform you about the poor performance in last financial year.I have seen many instances of work lapse. | 5 |

In some embodiments, the etiquette module 204 may apply a different number of rules depending on the section of the electronic message. For example, in Table 2 below, the etiquette module 204 may identify nine subject errors, six salutation errors, 13 errors in the body (i.e., 13 errors in both the opening and closing sentences), and eight errors in the closing of the electronic message.

TABLE 2

Section-wise error counts

| Section | Number of errors |
|---|---|
| Subject | 9 |
| Salutation | 6 |
| Email Body | 13 |
| Closing | 8 |

In some embodiments, the etiquette module 204 applies the following set of rules (or any subset of the rules): (1) missing information in any of the structured sections (e.g., the to line is empty, the subject line is empty, or the salutation is empty); (2) the subject is too long or too short, i.e. it is not within 30-60 characters (e.g., "NETORK issue" or "network issue in phillipines maximum candidates score −1 and −3 and please resolve quickly"); (3) there is punctuation present in the subject, such as ! & "\\ \?,:\@ \* $ # { } ' % (e.g., "how is pilot coming along with client . . . , why can't i get a timely response !!!"); (4) the subject uses spam words such as "free," "clearance," "sale," "profit," "deal" (e.g., "Clearance sale offer limited"); (5) the subject uses a name (e.g., "Abhishek can you please send me a quick review" where Abhishek is a name); (6) the subject includes a greeting (e.g., "Hello Sire \ offer Vodaphone \ free internet @299"); the subject includes particular words with parts of speech that are to be avoided, such as set (WDT (determiners like 'every'), CD (Cardinal number 'one', 'two'), CC (Coordinating Conjunction 'and', 'or')) (e.g., "A quick intro to ML"); (7) the subject uses particular phrases at the start of the subject, such as regarding, response, reply (e.g., "Regarding hiring of new employees"); (8) the subject capitalizes a word other than the first word of the subject except for proper nouns, abbreviations, subject specific words like IMP, RE; also capitalization inside a word; or usage of ALL CAPITALS (e.g., "network issue in india," "NETWORK ISSUE IN INDIA," "Network Issue In India"); (9) the salutation uses an inappropriate greeting, such as heyy, hey, good morning, respect* (e.g., "heyy abhishek," "hey! abhishek," "good morning abhishek sir"); (10) the salutation includes an incorrect use of a title, such as a title with a full name or first name or not using a title when referring to the last name (e.g., "Dear Mr Abhishek", "Hi Mr Abhishek Unnam", "Dear Unnam"); (11) the salutation has an incorrect usage of names or there is no name at all, a full name is used after the salutation, or no name is used at all (e.g., "Dear Abhishek Unnam", "Dear"); (12) the salutation uses punctuation other than a comma (",") at the end (e.g., "Dear's Abhishek," "Dear Abhishek," "Dear abhishek@unnam"); (13) the salutation includes capitalization errors present in any part of the salutation including name, greetings, or title (e.g., "DEAR AbhiShek," "Dear Mr unnam," "Dear Unnam abhishek"); (14) the closing signoff is missing or the closing signoff is inappropriate (e.g., Yours Respectfully, Yours Faithfully, yours truly, yours"); (15) the closing includes a title (e.g., "Regards, Mr. Abhishek Unnam, Aspiring Minds"); (16) the format of the name using in the closing fails to include the full name or there is an incorrect usage, such as only using a last name or a nickname (e.g., "Regards, Sid"); (17) the closing needs to mention the name of the company if the electronic message is being sent to someone outside of the company (e.g., "Regards, Mr. Abhishek Unnam," "Company name missing"); (18) the closing needs to include a designation if it is being sent to someone outside of the company or in some cases, outside of the team (e.g., "Regards, Mr. Abhishek Unnam," "Designation missing"); (19) the closing uses punctuation inside the closing other than "," "." and "@"—as there are cases when people mention links to different websites or any other electronic message identifier (e.g., "Regards, Mr. Abhishek aka Unnam, Aspiring Minds"); (20) the closing includes a capitalization error, ALL CAPS used, or proper nouns in lower case (e.g. "REGARDS Abhishek unnam"); (21) each new detail for the closing should be on a separate line (e.g., "Regards, Abhishek, Aspiring Minds, Research Engineer" all on the same line); (22) the body opening includes a capitalization error, proper nouns are wrongly capitalized, there is partial capitalization, or the start of the sentence is not capitalized (e.g., "Dear Abhishek, how are you. hope you are doing good. i am writing this mail to put forward a idea of mine . . . "); (23) the body opening includes punctuation errors, such as exclamation marks or curly parenthesis (e.g., "Hope everything is fine !!!. Good to hear. I had some doubts regarding {product name}"); (24) the body opening includes informal words, such as slang or messaging language (e.g., "How r u? Doing well. Wanna knw some stuff regarding . . . "); (25) the body opening or the body opening uses specific clichés, such as cherry on cake, as we can see, etc. (e.g., "Delivering the product on time was itself a daunting task and this turnover is definitely a cherry on the cake."); (26) the body opening or the body closing includes the wrong words for starting a sentence in the body opening (e.g., "Well, firstly how is it going with you. All good? In conclusion, could you please get ready all the . . . "); (27) the body opening asks about the person's health in the wrong way (e.g., "Hope you are in good health. How is your health. Hope you are all healthy."); (28) the body opening or the body closing uses too many kind words, such as please, sir, honor, grateful, etc. (e.g., "Sir, can you please please take this up on priority and i would be truly deeply obliged."); (29) the body closing has capitalization errors, proper nouns are wrongly capitalized, there is partial capitalization, or the start of the sentence is not capitalized (e.g., "looking forward to hearing from you. thanks for your time rahul."); (30) the body closing includes punctuation errors, such as exclamation marks or curly parenthesis (e.g., "I hope this won't happen again !!!. Please consider this as /'warning'/."); and (31) the body closing uses informal words, such as slang or messaging language (e.g., "can u pls include all pricing details in the proposal to be sent.").

In some embodiments, the etiquette module 204 applies the above rules selectively. For example, the closing does not need to have the full name of the person if it is a personal email but does need to have the full name if it is a formal electronic message, such as for a business purpose as indicated by the user input provided responsive to a prompt.

In some embodiments, the etiquette module 204 applies the rules using word lists. For example, the etiquette module 204 compares all the words in an electronic message to a list of words of abuse and/or slang and flags matches between the words in the electronic message and words in the list. In some embodiments, the etiquette module 204 also includes a word list of positive words, such as thank you, please, request, etc. The etiquette module 204 may count the number of matches with positive words and negative words and score the matches. In some embodiments, the etiquette module 204 normalizes the scores.

In some embodiments, the etiquette module 204 analyzes the electronic message to determine if it conforms to expected patterns. For example, the etiquette module 204 may determine that the recipient is addressed by using more than one combination of greeting (e.g., dear, hi, hey), title (e.g., Mr., Ms., Dr.), first name, and last name. The etiquette module 204 may identify that some combinations are right (e.g., Dear first name), while some combinations are wrong (e.g., Dear last name). In some embodiments, the user interface module 210 prompts a user for certain structured information in order to analyze the electronic message. For example, the user interface module 210 may ask the user to provide a recipient name, company name, center name, and keywords. The user interface module 210 may provide the user input to the etiquette module 204, which uses the information for error detection.

In some embodiments, the etiquette module 204 uses a training set to generate a machine-learning etiquette model. For example, the etiquette module 204 may use supervised learning to train the machine-learning etiquette model to assign an etiquette score to training messages in the training set, compare the assigned with corresponding groundtruth scores in the training set, and adjust one or more parameters om the machine-learning etiquette model based on the comparison.

In some embodiments, the etiquette module 204 uses machine learning to detect the etiquette errors either alone or in combination with applying rules. For example, the etiquette module 204 may generate a machine-learning etiquette model by using a training set and supervised learning. The etiquette module 204 may use training messages that were collected from people that were given 25 minutes to write a training message in response to one of three different situations for writing training messages. The three situations in this example may include a customer service situation where the writer needs to address a customer's complaints, a sales situation where the writer probes a prospect and promotes a services, and a people management situation where the writer needs to give feedback to an employee on performance issues. For example, the performance situation was as follows: "You are Alisha James. You work as a Senior Manager of Marketing and Promotions at Cognitive Solutions Inc. You receive an email with the monthly leave record of your team members from the HR department. You observe that one of your team members, Charlie Daniels (Charlie.daniels@cognitivesolutions.com), took five leaves in the previous month. Out of these, three were taken on a Friday. You have also observed that of late, he has been showing a casual attitude towards work. There were two occasions when he asked for an extension of the deadline. Write an email to Charlie providing feedback about his behavioral and performance issues."

In embodiments where the etiquette module 204 uses supervised learning, the reviewers apply a series of rules to determine whether the training message adhered to etiquette rules. For example, the above 31 rules could be used to score the training message. Once the etiquette module 204 generated a machine-learning etiquette model, the machine-learning etiquette model may receive user input in the form of a training message and output an etiquette score.

In some embodiments, the etiquette module 204 applies different scores based on the type of etiquette error that was detected. For example, a missing error is scored more severely than a redundancy error. In other embodiments, the different rules are scored equally.

The machine-learning content module 206 generates a machine-learning content model that analyzes the grammar of electronic messages. In some embodiments, the machine-learning content module 206 includes a set of instructions executable by the processor 235 to generate the machine-learning content model. In some embodiments, the machine-learning content module 206 is stored in the memory 237 of the computing device 200 and can be accessible and executable by the processor 235.

In some embodiments, the machine-learning content module 206 uses a training set to generate a machine-learning content model. For example, the machine-learning content module 206 may use supervised learning to score an electronic message on content and create the machine-learning content model to assign a content score to electronic messages.

In one example way to create a machine-learning content model, the training messages mentioned above with reference to the etiquette module 204 can also be used by the machine-learning content module 206.

In embodiments where the machine-learning content module 206 uses supervised learning, the reviewers apply a series of rules to determine whether the content properly addresses the purpose of the training message, is coherent, and is without unnecessary information. The scoring in this category is limited to the semantics of the training message and does not evaluate other parameters, such as the emotion of the training message.

In some embodiments, the machine-learning content module 206 trained the machine-learning content model to generate scores for each prompt. During training, the machine-learning content module 206 divided the corresponding dataset into the training set and a validation set. The machine-learning content module 206 used a stratified 70-30 split for the train-validation sets. The machine-learning content module 206 can use one or more of linear regression, linear regression with L2 regularization (ridge), support vector machine (SVM), and random forests to train the machine-learning content model. For ride regression, the machine-learning content module 206 varied the lambda from 1 to 100. For SVM, three kernels: linear, polynomial ($3^{rd}$ degree), and radial basis function were tested. In order to select the optimal SVM, the machine-learning content module 206 varied the penalty factor C, parameters ($\gamma$ and $\varepsilon$), and the SVM kernel. For random forest, the machine-learning content module 206 varied the number of estimators from 20 to 100. The machine-learning content module 206 used the select K-best algorithm for feature selection. The machine-learning content model with the lowest cross-validation (4-fold) error was selected for implementation in the machine-learning content module 206 to score electronic messages.

In some embodiments, the machine-learning content module 206 analyses the efficacy of the training set as compared to the machine-learning content model. The machine-learning content module 206 achieved an average inter-rater correlation 0.83 for the content scores.

TABLE 3

Performance of prompt-specific content models

| Model | # Features | Prompt 1 | | Prompt 2 | | Prompt 3 | |
| --- | --- | --- | --- | --- | --- | --- | --- |
| | | Train (r) | Validation (r) | Train (r) | Validation (r) | Train (r) | Validation (r) |
| Linear | 50 | 0.86 | 0.79 | 0.87 | 0.81 | 0.85 | 0.77 |
| Ridge | 50 | 0.86 | 0.80 | 0.87 | 0.81 | 0.84 | 0.77 |
| Random Forest | 150 | 0.95 | 0.80 | 0.95 | 0.82 | 0.92 | 0.79 |
| SVM | 50 | 0.84 | 0.79 | 0.86 | 0.80 | 0.83 | 0.76 |

Once the machine-learning content model is generated and validated, the machine-learning content module 206 receives an unstructured section of an electronic message (e.g., as parsed by parsing module 202) and outputs a content score. In some embodiments, the machine-learning content module 206 derives one or more of word embeddings, a bag of words, or a prompt overlap from the electronic message and provides one or more of the word embeddings, the bag of words, or the prompt overlap to the machine-learning content model. The machine-learning content model uses the input to generate the content score.

In some embodiments, the machine-learning content module 206 uses the word embeddings to capture a meaning of words used in the electronic message, rather than just the word itself. The machine-learning content module 206 may project the high dimensional word space (with each word as a single dimension) to a low dimension continuous vector space. In the transformed space, the machine-learning content module 206 maps the semantically similar words to nearby points. In some embodiments, the machine-learning content module 206 uses a neural network to perform the transformation. For example, the machine-learning content module 206 may use Word2vec, which uses a vocabulary of over three million words and phrases and is trained on about 100 billion words. For each word in the electronic message, the machine-learning content module 206 may calculate a 300-length lower dimensional vector and then sums the value of the vectors across all the words in the electronic message.

In some embodiments, the machine-learning content module 206 uses a bag of words feature-counts of unigrams, bigrams, and trigrams. All the words were stemmed and stop words were removed. The machine-learning content module 206 may use the bag of words in addition to word embeddings because an email typically has a lot of proper nouns and there are no embeddings for proper nouns. For example, electronic messages may include the name of a product that a company is selling. The presence or absence of these words is important for machine-learning content module 206 to use to generate a content score. In addition, the machine-learning content module 206 may use the bag of words in addition to word embeddings because the word embeddings may not capture phrases well that are captured by the bi-grams and the tri-grams used by the bag of words.

In some embodiments, the machine-learning content module 206 uses a prompt overlap to determine whether an overlap between the prompt and the electronic message reflects a relevance of the content of the electronic message. The machine-learning content module 206 determines whether information from the prompt is reproduced or used in the electronic message using exact match and/or extended match. For exact match, the machine-learning content module 206 counts a number of common words between the prompt and the electronic message. For extended match, the machine-learning content module 206 adds the synonyms of all words in the prompt using a database of semantic relations between words, such as WordNet. The extended match captures the semantic overlap of the prompt and the electronic message when the machine-learning content module 206 counts the number of common words between the extended prompt word list and the words in the electronic message.

The machine-learning grammar module 208 generates a machine-learning grammar model that analyzes the grammar of electronic messages. In some embodiments, the machine-learning grammar module 208 includes a set of instructions executable by the processor 235 to generate the machine-learning grammar model. In some embodiments, the machine-learning grammar module 208 is stored in the memory 237 of the computing device 200 and can be accessible and executable by the processor 235.

In some embodiments, the machine-learning grammar module 208 uses a training set to generate a machine-learning grammar model. For example, the machine-learning grammar module 208 may use supervised learning to score a training message on grammar and create the machine-learning grammar model to assign a grammar score to training messages. In some embodiments, the training set is the same set of training messages that were generated and described above for testing the machine-learning content model and/or the etiquette model.

In embodiments where the machine-learning grammar module 208 uses supervised learning, the reviewers apply a series of rules to evaluate the grammatical correctness of the training messages.

In some embodiments, the machine-learning grammar module 208 trained the machine-learning grammar model to generate scores across all prompts. The machine-learning grammar module 208 divided the corresponding dataset into the training set and a validation set. The machine-learning grammar module 208 used a stratified 70-30 split for the train-validation sets. The machine-learning grammar module 208 may use linear regression, linear regression with L2 regularization (ridge), SVM, and/or random forests to train the machine-learning grammar model. For ride regression, the machine-learning grammar module 208 varied the lambda from 1 to 100. For SVM, three kernels: linear, polynomial ($3^{rd}$ degree), and radial basis function were tested. In order to select the optimal SVM, the machine-learning grammar module 208 varied the penalty factor C, parameters ($\gamma$ and $\varepsilon$), and the SVM kernel. For random forest, the machine-learning grammar module 208 varied the number of estimators from 20 to 100. The machine-learning grammar module 208 used the select K-best algorithm for feature selection. The machine-learning grammar model with the lowest cross-validation (4-fold) error may be selected to implement the machine-learning grammar module 208 to score messages.

In some embodiments, the machine-learning grammar module 208 analyses the efficacy of the training set as compared to the machine-learning grammar model. The machine-learning grammar module 208 achieved an average inter-rater correlation 0.74 for the grammar scores.

TABLE 4

Performance of grammar models trained on a complete set of training messages that includes overall and prompt wise validation correlations.

| Model | # Features | Train (r) | Validation | | | |
|---|---|---|---|---|---|---|
| | | | Overall (r) | Prompt 1 (r) | Prompt 2 (r) | Prompt 3 (r) |
| Linear | 75 | 0.77 | 0.62 | 0.59 | 0.65 | 0.65 |
| Ridge | 75 | 0.70 | 0.66 | 0.62 | 0.67 | 0.75 |
| Random Forest | 150 | 0.85 | 0.73 | 0.71 | 0.73 | 0.74 |
| SVM | 150 | 0.62 | 0.60 | 0.52 | 0.59 | 0.74 |

Once the machine-learning grammar model is generated and validated, the machine-learning grammar module 208 receives an unstructured section of an electronic message and outputs a grammar score. In some embodiments, the machine-learning grammar module 208 derives one or more of a bag of part of speech (POS) tags, a bag of stopwords POS (SPOS) tags, a count of grammar errors, or a proportion of grammatically correct tags in the electronic message and provides one or more of the bag of POS tags, the bag of SPOS tags, the count of grammar errors, or the proportion of grammatically correct tags to the machine-learning grammar model. The machine-learning grammar model uses the input to generate the grammar score.

In some embodiments, the machine-learning grammar module 208 uses the bag of POS tags by assigning words to their respective part of speech tags using a tagger, such as the Penn Treebank NLTK tagger. The machine-learning grammar module 208 considers bigrams and trigrams of POS tags. The machine-learning grammar module 208 removes the semantic information from the words, while preserving the sentence structure and grammatical features.

In some embodiments, the machine-learning grammar module 208 determines that the POS tags convert the high dimensional sentences to a very low dimension, losing information useful to identify grammatical errors. For example, "a," "an," and "the" are all abstracted to a POS tag referred to as determiner. However, the usage of one determiner versus another causes article errors. Similarly, prepositions have the same/similar POS tags, while a wide variety of grammatical errors are due to wrong usage of prepositions (e.g., sleep on bed versus sleep in/at bed). With this insight, the machine-learning grammar module 208 retains a set of words that may help to spot grammatical errors and did not replace them with their POS tags. As a result, the machine-learning grammar module 208 retained words that generally occur with high frequency and do not have deep semantic information. Because the list is similar to the words considered as stopwords, they are referred to here as SPOS tags, which are POS tags with stopwords retained. The machine-learning grammar module 208 considers bigrams and trigrams of SPOS tags. Below, table 5 illustrates a POS and a SPOS representation of a sentence.

TABLE 5

| POS and SPOS sentence form | | | | | | | | | |
|---|---|---|---|---|---|---|---|---|---|
| | Susan | has | taught | middle | school | english | for | 5 | years. |
| | ↓ | ↓ | ↓ | ↓ | ↓ | ↓ | ↓ | ↓ | ↓ |
| POS | NNP | VBZ | VBN | JJ | NN | NN | IN | CD | NNS. |
| SPOS | NNP | "has" | VBM | JJ | NN | NN | "for" | CD | NNS. |

In some embodiments, the machine-learning grammar module 208 uses counts of grammatical errors in an electronic message as identified by grammar correction tools.

In some embodiments, the machine-learning grammar module 208 determines a proportion of grammatically correct tags in order to find the similarity of language in the electronic messages with a grammatically correct corpus. The machine-learning grammar module 208 may use a Brown corpus that contains text from about 500 sources pertaining to different genres, such as news and editorials. The machine-learning grammar module 208 generated a bag of POS and SPOS bi-grams and tri-grams from the corpus. The machine-learning grammar module 208 may consider a percentage above a threshold amount (e.g., a top 70%) most frequently occurring POS and SPOS bigrams and trigrams to be the good n-grams. The machine-learning grammar module 208 may then determine a proportion of the n-grams in electronic messages that are good n-grams.

The user interface module 210 generates a user interface. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

In some embodiments, the user interface module 210 generates graphical data that is rendered on the user device 115 as a user interface.

The user interface may be used for obtaining training set data. The user interface may include a prompt for a user that includes instructions for how to create the electronic message as described above with reference to the machine-learning content module 206. The user interface module 210 may also prompt a user for certain structured information in order to analyze the electronic message. In some embodiments, the user interface module 210 prompts the user to provide purpose for the electronic message. For example, the user may select the purpose from a drop-down menu that includes items, such as personal email, business email or more specific purposes, such as customer complaint, invitation to a party, etc. In another example, the prompt includes a field where the user enters free-form text describing the purpose of the electronic message. In some embodiments, the user interface module 210 asks the user to provide a recipient name, company name, center name, and keywords. The user interface module 210 may provide the user input to the parsing module 202, which divides the user input into sections and transmits the sections to the etiquette module 204, the machine-learning content module 206, or the machine-learning grammar module 208 accordingly.

In some embodiments, the user interface module 210 generates a user interface that is used by reviewers to provide feedback on scored electronic messages. In some embodiments, the user interface receives identification of errors from the reviewer and provides the feedback to the corresponding modules for generating scores.

In some embodiments, the user interface module 210 generates a user interface for receiving electronic messages from users and provide the electronic messages to the other modules (204, 206, and 208) for scoring. The user interface module 210 provides the electronic message to the parsing module 202 for analysis. The user interface module 210 may receive an etiquette score from the etiquette module, a content score from the machine-learning content module 206, and a grammar score from the machine-learning grammar module 208. The user interface module 210 may generate an overall score that is an average of the etiquette score, the grammar score, and the content score and provide an error summary that includes the overall score, the etiquette score, the grammar score, and the content score. In some embodiments, the user interface module 210 generates an error summary that details at least one of a number of etiquette errors, a number of spelling errors, a number of white space errors, a number of style errors, a number of grammar errors, or a number of typographical errors.

In some embodiments, the user interface module 210 provides feedback that suggests how to modify the electronic message to improve at least one of the etiquette score, the grammar score, or the content score. For example, the user interface module 210 may highlight at least one of the etiquette score, the grammar score, or the content score and each error in the electronic message. In some embodiments, the user interface module 210 suggests a correction for the highlighted errors. For example, if the electronic message addresses "Dear Smith" the user interface module 210 may display a suggestion of "Dear Mr. Smith" or "Dear Harry" when a pointer hovers over the error. In other embodiments, the user interface module 210 automatically corrects each of the errors. The user interface module 210 may highlight words that were replaced in the electronic message so that, for example, the original word is displayed when a pointer hovers over the highlighted word.

Figure 4A:
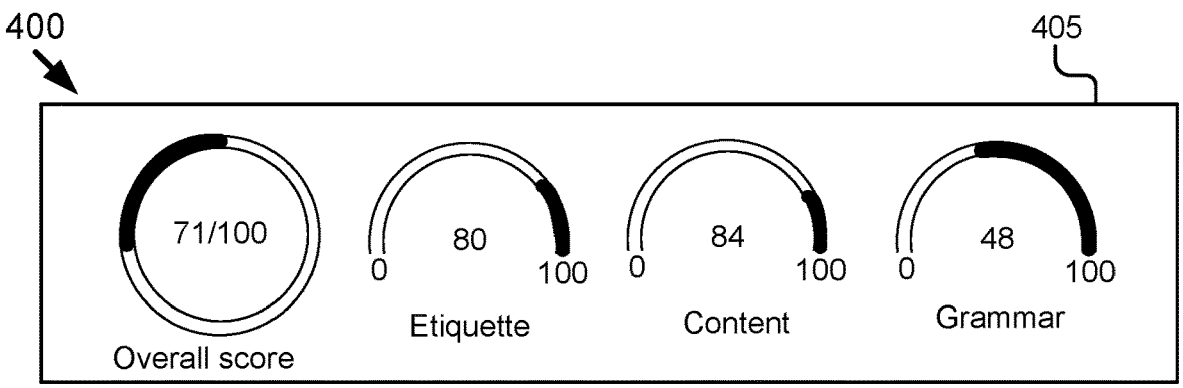
FIGS. 4A and 4B illustrate example feedback, according to some embodiments.
Figure 4B:

Turning to FIGS. 4A and 4B, example feedback is illustrated. FIG. 4A illustrates a feedback user interface 400 that includes a score section 405 with an overall score, an etiquette score, a content score, and a grammar score. The feedback user interface 400 also includes a response section 410 with various errors that are identified and illustrated with different patterns. For example, the etiquette errors are depicted with a first error pattern, the spelling errors are depicted with a second error pattern, the white space errors are depicted with a third error pattern, the style errors are depicted with a fourth error pattern, the grammar errors are depicted with a fifth error pattern, and the typographical errors are depicted with a sixth error pattern. Other ways of identifying errors are possible, such as by using color coding. The error summary and email statistics section 415 includes a key for the different types of errors and statistics about the electronic message. In this example, the user interface module 210 provides suggestions for a correction when the user moves a pointer device (e.g., a mouse, a finger, etc.) over an error. For example, if the user hovers over "remembered" the user interface module 210 suggests that the word be replaced with "remind."

FIG. 4B illustrates feedback 450 that is a more specific type of error analysis that identifies an error type, an error category, and the number of times that a particular error occurred in the electronic message. In this example, there are two wrong etiquette errors, one punctuation etiquette error, one missing etiquette error, three missing/wrong etiquette errors, one adjective/adverb grammar error, one determiner/preposition/article grammar error, one verb form or verb tense grammar error, three spelling errors, one word error—misused/split/merge words spelling error, five white space errors, and two typographical errors.

Example Methods

Figure 5:
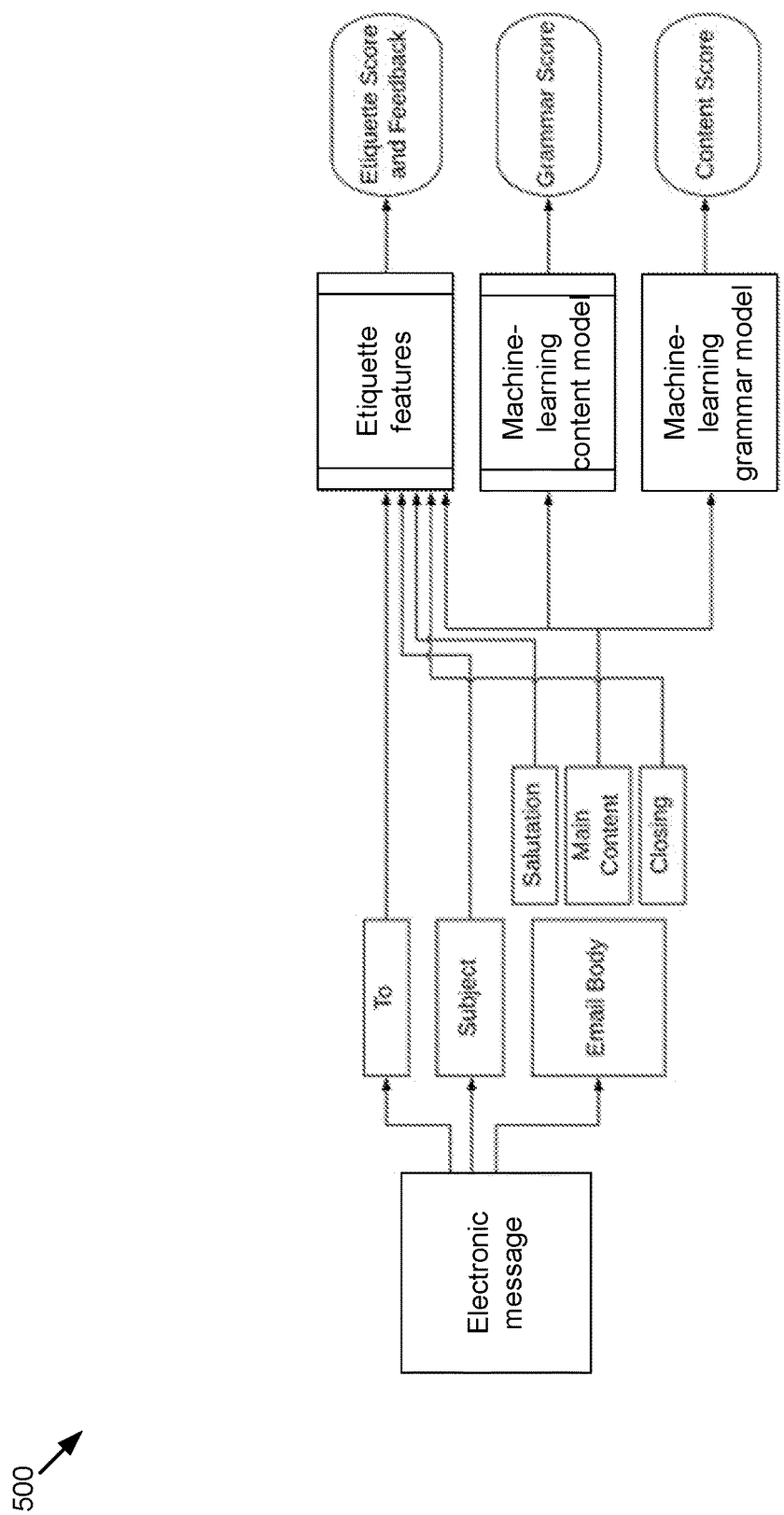
FIG. 5 illustrates a breakdown of an electronic message into sections and analysis by machine-learning models, according to some embodiments.

FIG. 5 illustrates a breakdown 500 of an electronic message into sections and analysis with etiquette rules, a machine-learning content model, and a machine-learning grammar model. The electronic message is broken down into sections by the parsing module 202 that include a recipient, a subject, and an email body. The email body is further broken down into a salutation, main content, and a closing. In this example, all sections except the main content are analyzed for etiquette features. The machine-learning content model and the machine-learning grammar model analyze the main content. Analysis for etiquette features results in an etiquette score and feedback. Analysis for grammar results in a grammar score. Analysis for content results in a content score.

Figure 6:
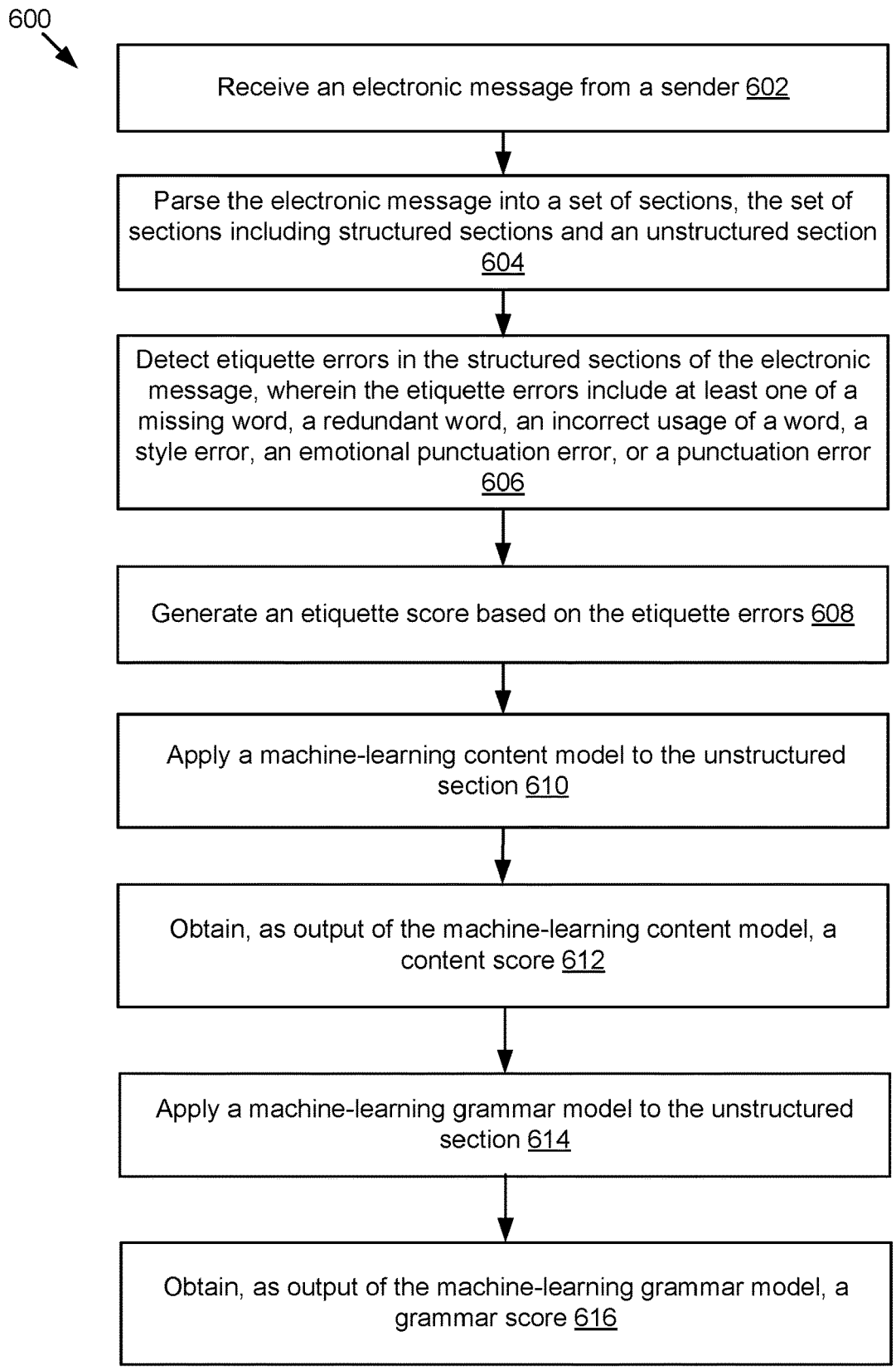
FIG. 6 illustrates a flowchart of an example method to analyze electronic messages, according to some embodiments.

FIG. 6 illustrates a flowchart of an example method 600 to analyze electronic messages, according to some embodiments. The method 600 is performed by an electronic message application 103 stored on a computing device 200. In some embodiments, the computing device is a user device 115 or a server system 101.

At step 602, an electronic message is received from a sender. At step 604, the electronic message is parsed into a set of sections, the set of sections including structured sections and an unstructured section. At step 606, an etiquette error is detected in the structured sections of the electronic message, where the etiquette errors include at least one of a missing word, a redundant word, an incorrect usage of a word, a style error, an emotional punctuation error, or a punctuation error. At step 608, an etiquette score is generated based on the etiquette errors.

At step 610, a machine-learning content model is applied to the unstructured section. At step 612, a content score is obtained as output of the machine-learning content model. At step 614, a machine-learning grammar model is applied to the unstructured section. At step 616, a grammar score is obtained as output of the machine-learning grammar model.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A method comprising:
   receiving an electronic message from a sender;
   parsing the electronic message into a set of sections, the set of sections including structured sections and an unstructured section;
   detecting etiquette errors in the structured sections of the electronic message, wherein the etiquette errors include at least one of a missing word, a redundant word, an incorrect usage of a word, a style error, an emotional punctuation error, or a punctuation error;
   generating an etiquette score based on the etiquette errors;
   applying a machine-learning grammar model to the unstructured section;
   obtaining, as output of the machine-learning grammar model, a grammar score;
   applying a machine-learning content model to the unstructured section; and
   obtaining, as output of the machine-learning content model, a content score.

2. The method of claim 1, further comprising:
   highlighting the etiquette score and each etiquette error in the electronic message to prompt the sender to correct the etiquette errors; and
   providing a recommendation for how to correct the etiquette errors.

3. The method of claim 1, further comprising correcting the etiquette errors in the electronic message.

4. The method of claim 1, wherein the structured sections include a subject, a salutation, an opening sentence of a body, a closing sentence of a body, and a closing.

5. The method of claim 1, further comprising:
   generating an overall score that is an average of the etiquette score, the grammar score, and the content score; and
   providing an error summary that includes the overall score, the etiquette score, the grammar score, and the content score.

6. The method of claim 1, further comprising generating an error summary that details at least one of a number of etiquette errors, a number of spelling errors, a number of white space errors, a number of style errors, a number of grammar errors, or a number of typographical errors.

7. The method of claim 1, wherein the machine-learning grammar model is generated based on training set data that includes training messages associated with corresponding grammar scores that score the training messages based on a set of rubrics.

8. The method of claim 1, further comprising providing feedback that suggests how to modify the electronic message to improve at least one of the etiquette score, the grammar score, or the content score.

9. The method of claim 1, wherein one or more of the machine-learning content model or the machine-learning grammar model are made using one or more of linear or non-linear techniques.

10. The method of claim 1, further comprising:
    deriving one or more of word embeddings, a bag of words, or a prompt overlap from the electronic message; and
    providing one or more of the word embeddings, the bag of words, or the prompt overlap to the machine-learning content model, wherein the machine-learning content model outputs the grammar score as a result.

11. The method of claim 1, further comprising:
    deriving one or more of a bag of part of speech (POS) tags, a bag of stopwords POS (SPOS) tags, a count of grammar errors, or a proportion of grammatically correct tags in the electronic message; and
    providing the one or more of the bag of POS tags, the bag of SPOS tags, the count of grammar errors, or the proportion of grammatically correct tags to the machine-learning grammar model, wherein the machine-learning grammar model outputs the grammar score as a result.

12. A system comprising:
    one or more processors; and
    a memory coupled to the processor that stores instructions that, when executed by the one or more processors, cause the one or more processors to perform operations comprising:
    receiving an electronic message from a sender;
    parsing the electronic message into a set of sections, the set of sections including structured sections and an unstructured section;
    detecting etiquette errors in the structured sections of the electronic message, wherein the etiquette errors include at least one of a missing word, a redundant word, an incorrect usage of a word, a style error, an emotional punctuation error, or a punctuation error;
    generating an etiquette score based on the etiquette errors;
    applying a machine-learning grammar model to the unstructured section;
    obtaining, as output of the machine-learning grammar model, a grammar score;
    applying a machine-learning content model to the unstructured section; and
    obtaining, as output of the machine-learning content model, a content score.

13. The system of claim 12, wherein the operations further comprise:
    highlighting the etiquette score and each etiquette error in the electronic message to prompt the sender to correct the etiquette errors; and
    providing a recommendation for how to correct the etiquette errors.

14. The system of claim 12, wherein the operations further comprise:
    deriving one or more of word embeddings, a bag of words, or a prompt overlap from the electronic message; and
    providing one or more of the word embeddings, the bag of words, or the prompt overlap to the machine-learning content model, wherein the machine-learning content model outputs the grammar score as a result.

15. The system of claim 12, wherein the operations further comprise:
  deriving one or more of a bag of part of speech (POS) tags, a bag of stopwords POS (SPOS) tags, a count of grammar errors, or a proportion of grammatically correct tags in the electronic message; and
  providing the one or more of the bag of POS tags, the bag of SPOS tags, the count of grammar errors, or the proportion of grammatically correct tags to the machine-learning grammar model, wherein the machine-learning grammar model outputs the grammar score as a result.

16. A non-transitory computer-readable medium comprising instructions stored thereon that, when executed by one or more computers, cause the one or more computers to perform operations, the operations comprising:
  receiving an electronic message from a sender;
  parsing the electronic message into a set of sections, the set of sections including structured sections and an unstructured section;
  detecting etiquette errors in the structured sections of the electronic message, wherein the etiquette errors include at least one of a missing word, a redundant word, an incorrect usage of a word, a style error, an emotional punctuation error, or a punctuation error;
  generating an etiquette score based on the etiquette errors;
  applying a machine-learning grammar model to the unstructured section;
  obtaining, as output of the machine-learning grammar model, a grammar score;
  applying a machine-learning content model to the unstructured section; and
  obtaining, as output of the machine-learning content model, a content score.

17. The non-transitory computer-readable medium of claim 16, wherein the operations further comprise:
  highlighting the etiquette score and each etiquette error in the electronic message to prompt the sender to correct the etiquette errors; and
  providing a recommendation for how to correct the etiquette errors.

18. The non-transitory computer-readable medium of claim 16, wherein the operations further comprise:
  generating an overall score that is an average of the etiquette score, the grammar score, and the content score; and
  providing an error summary that includes the overall score, the etiquette score, the grammar score, and the content score.

19. The non-transitory computer-readable medium of claim 16, wherein the operations further comprise generating an error summary that details at least one of a number of etiquette errors, a number of spelling errors, a number of white space errors, a number of style errors, a number of grammar errors, or a number of typographical errors.

20. The non-transitory computer-readable medium of claim 16, wherein the machine-learning grammar model is generated based on training set data that includes training messages associated with corresponding grammar scores that score the training messages based on a set of rubrics.

* * * * *